United States Patent Office 3,329,656
Patented July 4, 1967

3,329,656
ZINC CHELATES AS CATALYSTS IN THE PRODUCTION OF POLYESTERS
Cilton W. Tate, Cary, Roland J. Bryan, Jr., Raleigh, and Henry L. King, Cary, N.C., assignors to Monsanto Company, St. Louis, Mo., a corporation of Delaware
No Drawing. Filed Sept. 8, 1966, Ser. No. 577,796
9 Claims. (Cl. 260—75)

ABSTRACT OF THE DISCLOSURE

This invention relates to the production of polyesters from glycols and dicarboxylic acids or ester-forming derivatives thereof wherein either or both the esterification reaction and the subsequent polymerization reaction is carried out in the presence of catalytic amounts of a zinc chelate of the formula

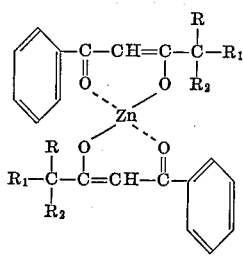

wherein R, $R_1$ and $R_2$, being the same or different, are members of a group consisting of hydrogen and halogen atoms.

---

This application is a continuation-in-part of our copending application, Ser. No. 254,420, filed Jan. 28, 1963, and entitled "Zinc Chelates as Catalysts in the Production of Polyesters" now abandoned.

This invention relates to an improved method for preparing polyesters, such as those obtained by condensation reactions of polyhydric alcohols and dibasic acids or reactive derivatives thereof. More particularly this invention relates to such a method which employs a novel catalyst in the reaction mixture.

Polymeric polyesters are prepared by heating together dihydric alcohols or functional derivatives thereof and dicarboxylic acids or polyester-forming derivatives thereof. Highly polymerized polyesters can be formed into filaments, fibers, films, and the like which can be permanently oriented. The most widely known and most important commercially of the polymeric polyesters is polyethylene terephthalate which normally is prepared by an ester interchange reaction of dimethyl terephthalate with ethylene glycol to form bis-betahydroxy ethyl terephthalate, and subsequent polymerization of the bis-betahydroxy ethyl terephthalate under reduced pressure and at elevated temperatures.

In effecting the foregoing ester interchange reaction and polymerization procedures, catalysts have been sought to accelerate the reactions and increase the conversions. While considerable improvement has been achieved with previously disclosed catalysts such as zinc acetylacetonate, greater accelerating of the reactions and increase in the conversions are desired. A catalytic process for the above purpose which would give efficient conversions and at the same time decrease the reaction time necessary would constitute an important advance in the art.

It is an object of this invention to provide an improved process employing novel catalysts which accelerate the ester interchange reaction between glycols and esters of dicarboxylic acids.

It is another object of this invention to provide an improved process employing novel catalysts which accelerate the polymerization of reactive intermediates obtained from glycols and esters of dicarboxylic acids into polyesters.

It is a further object of this invention to provide an improved process for producing polyesters through the use of novel catalysts which accelerate the polyester-forming reactions.

Other objects and advantages of this invention will be apparent from the description which follows.

The objects of this invention are accomplished by conducting either or both the ester interchange reaction between glycols and esters of dicarboxylic acids, and subsequent polymerization of the resulting reactive intermediate, in the presence of catalytic amounts of a zinc chelate of the formula

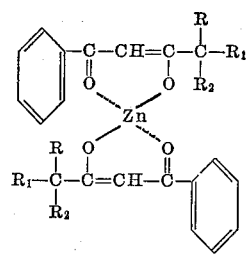

wherein R, $R_1$ and $R_2$, being the same or different, are members of a group consisting of hydrogen and halogen atoms.

In the preparation of polymeric polyesters by means of an ester interchange reaction, the method comprises two steps. In the first stage, a glycol such as ethylene glycol and an ester of a dicarboxylic acid such as dimethyl terephthalate are reacted at elevated temperatures to form a reactive intermediate such as bis-betahydroxy ethyl terephthalate and methanol which is normally removed by distillation. Thereafter in the second or polymerization stage the ester interchange reactive intermediate, such as bis-betahydroxy ethyl terephthalate is heated at still higher temperatures and under reduced pressure to form a polyester, such as polyethylene terephthalate, with the elimination of glycol which is readily removed from the system during the polymerization reaction. The second or polymerization step is continued, if a fiber-forming polymer is desired, until the reaction product has the desired degree of polymerization, which may be determined by viscosity measurements. Without the use of catalysts, the above reactions proceed at negligible rates even at high temperatures.

Of course, as will be recognized by those skilled in the art, the reactive intermediate which is polymerized to give a fiber-forming polymer may be prepared by other ways than ester interchange. For example, bis-betahydroxy ethyl terephthalate may be prepared by the reaction of ethylene carbonate with terephthalic acid, by the reaction of terephthaloyl chloride with ethylene glycol, by the reaction of ethylene oxide with terephthalic acid, by the reaction of terephthalic acid with ethylene glycol and the like. Usually, however, this intermediate is obtained from dialkyl esters of dicarboxylic acids and glycols as described. Regardless of how the reactive intermediate is obtained, the polymerization reaction to form polymeric polyesters is effectively accelerated by conducting this reaction in the presence of catalytic amounts of the zinc chelates described above.

This invention contemplates conducting both steps of the polyester reaction, either separately or consecutively, in the presence of catalytic amounts of the zinc chelates of this invention. The amount of catalyst employed may be varied from about .02 to about 2.0 percent, based on the weight of dialkylester of the dicarboxylic acid being employed, and more preferably is varied from about .05 to about 0.5 percent. Illustrative of the zinc chelates found useful as catalysts in carrying out the process of this invention are bis-(1-phenyl-1,3-butanediono) zinc,
bis-(1-phenyl-4-fluoro-1,3-butanediono) zinc,
bis-(1-phenyl-4,4-difluoro-1,3-butanediono) zinc,
bis-(1-phenyl-4,4,4-trifluoro-1,3-butanediono) zinc,
bis-(1-phenyl-4-chloro-1,3-butanediono) zinc,
bis-(1-phenyl-4,4-dichloro-1,3-butanediono) zinc,
bis-(1-phenyl-4,4,4-trichloro-1,3-butanediono) zinc,
bis-(1-phenyl-4-bromo-1,3-butanediono) zinc,
bis-(1-phenyl-4,4-dibromo-1,3-butanediono) zinc,
bis-(1-phenyl-4,4,4-tribromo-1,3-butanediono) zinc,
bis-(1-phenyl-4-iodo-1,3-butanediono) zinc,
bis-(1-phenyl-4,4-diiodo-1,3-butanediono) zinc,
bis-(1-phenyl-4,4,4-triiodo-1,3-butanediono) zinc and the like.

The zinc chelates of this invention may be prepared by the following method: 0.25 mole of the appropriate diketone, such as 1-phenyl-4,4,4-trifluoro-1,3-butanedione or 1-phenyl-1,3-butanedione is suspended in 100 ml. of water and 6 N ammonia is added dropwise, with stirring, to the suspension until solution is complete. The solution is then filtered to remove any undissolved particles and added, with stirring, to a 0.1 molar solution of zinc chloride or zinc sulfate. The zinc chelate will precipitate out of solution at this point. The mixture is then filtered and the zinc chelate precipitate is washed with water and then dried in a vacuum oven. Purification may be effected by recrystallization from benzene with the addition of isopropyl ether.

When the catalysts of this invention are employed in carrying out either or both stages of the polyesterification reaction, the reaction time needed is greatly reduced. For example, a polyesterification reaction using bis-(1-phenyl-4,4,4-trifluoro-1,3-butanediono) zinc as a catalyst took approximately one-half the time necessary when zinc acetylacetonate was used as a catalyst. This increased reaction activity is believed due to the increased electronegativity found in the structure of the catalysts of this invention.

It is also contemplated that the catalysts of this invention may be employed in conjunction with other polyester catalysts which may be effective during either or both stages of the polyesterification reactions.

The ester interchange reaction, when employed, is normally conducted at atmospheric pressure and at a temperature in the range of about 65° C. to about 300° C. depending upon the boiling point of the alcohol to be removed as a result of the ester interchange reaction. In many cases reduced pressures may be employed. In reactions when lower boiling alcohols are to be removed, a temperature from about 150° C. and 225° C. is normally used. This reaction is normally conducted until all the alcohol has been evolved and removed by distillation, and any excess glycol is also removed by distillation. The polymerization reaction is conducted at temperatures in the range of about 200° C. to about 350° C. under reduced pressure from less than about 1 mm. to about 5 mm. of mercury and is normally conducted under nitrogen or other inert gas which is substantially free of oxygen.

The synthetic linear condensation polyesters contemplated in the practice of this invention are those formed from dicarboxylic acids and glycols, and copolyesters or modifications of these polyesters and copolyesters. In a highly polymerized condition, these polyesters and copolyesters can be formed into filaments and the like and subsequently oriented permanently by cold drawing.

The polyesters and copolyesters specifically useful in the instant invention are those resulting from heating one or more of the glycols of the series $HO(CH_2)_nOH$, in which $n$ is an integer from 2 to 10, with one or more dicarboxylic acids or ester-forming derivatives thereof.

Among the dicarboxylic acids and ester-forming derivatives thereof useful in the present invention are terephthalic acid,
isophthalic acid,
sebacic acid,
adipic acid,
p-carboxyphenoacetic acid,
succinic acid,
p,p'-dicarboxybipheno,
p,p'-dicarboxycarbanilide,
p,p'-dicarboxythiocarbanilide,
p,p'-dicarboxydiphenylsulfone,
p-carboxyphenoxyacetic acid,
p-carboxyphenoxypropionic acid,
p-carboxyphenoxybutyric acid,
p-carboxyphenoxyvaleric acid,
p-carboxyphenoxyhexanoic acid,
p-carboxyphenoxyheptanoic acid,
p,p'-dicarboxydiphenylmethane,
p,p'-dicarboxydiphenylethane,
p,p'-dicarboxydiphenylpropane,
p,p'-dicarboxydiphenylbutane,
p,p'-dicarboxydiphenylpentane,
p,p'-dicarboxydiphenylhexane,
p,p'-dicarboxydiphenylheptane,
p,p'-dicarboxydiphenyloctane,
p,p'-dicarboxydiphenoxyethane,
p,p'-dicarboxydiphenoxypropane,
p,p'-dicarboxydiphenoxybutane,
p,p'-dicarboxydiphenoxypentane,
p,p'-dicarboxydiphenoxyhexane,
3-alkyl 4-(beta-carboxy ethoxy) benzoic acid,
oxalic acid,
glutaric acid,
pimelic acid,
suberic acid,
azelaic acid and the dioxy acids of ethylene dioxide having the general formula $$HOOC-(CH_2)_n-O-CH_2CH_2-O-(CH_2)_n-COOH$$

wherein $n$ is an integer from 1 to 4, and the aliphatic and cycloaliphatic aryl esters and half esters, ammonium and amine salts, and the acid halides of the above-named compounds and the like. Examples of the glycols which may be employed in practicing the instant invention are ethylene glycol, trimethylene glycol, tetramethylene glycol and decamethylene glycol and the like. Polyethylene terephthalate, however, is preferred because of the ready availability of terephthalic acid and ethylene glycol, from which it is made. It also has a relatively high melting point of about 250 through 255° C. and this property is particularly desirable in the manufacture of filaments in the textile industry.

Among the modified polyesters and copolyesters which are useful in the practice of the present invention are those polyesters mentioned above modified with dialkyl esters of saturated essentially linear aliphatic dicarboxylic acids containing 20 carbon atoms having the general formula

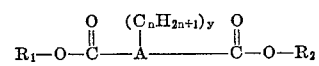

$$R_1-O-\overset{O}{\underset{\|}{C}}-A\overset{(C_nH_{2n+1})_y}{\underset{|}{\phantom{C}}}\overset{O}{\underset{\|}{C}}-O-R_2$$

wherein $R_1$ and $R_2$ are alkyl radicals containing from 1 to 10 carbon atoms and more preferably are alkyl hydrocarbon radicals containing from 1 to 5 carbon atoms including methyl, ethyl, propyl, isopropyl, n-butyl, sec. butyl, isobutyl, n-amyl, isoamyl, and the like; A is a linear saturated aliphatic radical containing from 14 to 18 carbon atoms in its chain; $n$ is an integer of either 1 or 2; and $y$ is an integer from 0 to 2. The total number of carbon atoms in A and the side chains thereof is 18. $R_1$ and $R_2$ may be the same or may be different alkyl radicals. Representative dialkyl esters found useful in this invention include dialkyl 1,20-eicosane dioate, dialkyl 8-ethyl octadecane-1,18-dioate, dialkyl dimethyl octadecane-1,18-dioate, dialkyl diethylhexadecane-1,16-dioate and the like, where the dialkyl groups are methyl ethyl, propyl, and the like including alkyl hydrocarbon radicals containing from 1 to 5 carbon atoms. Mixtures of any of the materials described above may also be used. For example, mixtures of above 20 to 80 weight percent of dimethyl 1,20-eicosane dioate and about 80 to 20 weight percent of dimethyl 8-ethyl octadecane-1,18-dioate are quite useful. The amounts of necessary reactants employed to make the modified polyesters, on a molar basis, are ordinarily one mole equivalent of a mixture of the two types of dialkyl esters of aromatic and $C_{20}$ dicarboxylic acids and a molar excess of the glycol. In the mixtures of the dialkyl esters, the dialkyl aromatic dicarboxylic acid esters are present in amounts from about 65 to 95 weight percent and the dialkyl ester of the aliphatic $C_{20}$ dicarboxylic acid is present in amounts from about 35 to about 5 weight percent.

Among the modified polyesters and copolyesters which are useful in the practice of the present invention are the polyesters and copolyesters mentioned above modified with chain-terminating groups having hydrophilic properties, such as the monofunctional ester-forming polyesters bearing the general formula,

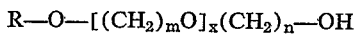

$$R\!-\!O\!-\![(CH_2)_mO]_x(CH_2)_n\!-\!OH$$

wherein R is an alkyl group containing 1 to 18 carbon atoms or an aryl group containing 6 to 10 carbon atoms, and $m$ and $n$ are integers from 2 to 22, and $x$ is a whole number indicative of the degree of polymerization, that is, $x$ is an integer from 1 to 100 or greater. Examples of such compounds are methoxypolyethylene glycol, ethoxypolyethylene glycol, n-propoxypolyethylene glycol, isopropoxypolyethylene glycol, butoxypolyethylene glycol, phenoxypolyethylene glycol, methoxypolypropylene glycol, methoxypolybutylene glycol, phenoxypolypropylene glycol, phenoxypolybutylene glycol, methoxypolymethylene glycol, and the like. Suitable polyalkylvinyl ethers having one terminal hydroxyl group are the addition polymers prepared by the homopolymerization of alkylvinyl ethers wherein the alkyl group contains from 1 to 4 carbon atoms. Examples of such chain-terminating agents are hydroxy polymethylvinyl ether, hydroxy polyethylvinyl ether, hydroxy polypropylvinyl ether, hydroxy polybutylvinyl ether, hydroxy polyisobutylvinyl ether, and the like. The chain-terminating agents or compounds may be employed in the preparation of the modified polyesters, in amounts ranging from 0.05 mole percent to 4.0 mole percent, based on the amount of dicarboxylic acid or dialkyl ester thereof employed in the reaction mixture. It is to be noted that when chain-terminating agents are employed alone, i.e., without a chain-branching agent, the maximum amount that can be employed in the reaction mixture is 1.0 mole percent. Thus, unexpectedly, the addition of controlled amounts of chain-branching agents along with the chain-terminating agents allows the introduction of an increased amount of the latter into the polymer chain than is otherwise possible when employing the chain-terminating agents alone.

One will readily appreciate that the weight percent of chain-terminating agent which may be employed in this invention will vary with the molecular weight of the agent. The range of average molecular weights of the chain-terminating agents suitable for use in this invention is from 500 to 5000, with those agents having a molecular weight in the range of 1000 to 3500 being preferred.

Materials suitable as chain-branching agents or cross-linking agents, which are employed to increase the viscosity or molecular weight of the polyesters, are the polyols which have a functionality greater than two, that is, they contain more than two functional groups, such as hydroxyl. Examples of suitable compounds are pentaerythritol; compounds having the formula:

$$R\!-\!(OH)_n$$

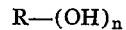

wherein R is an alkylene group containing from 3 to 6 carbon atoms and $n$ is an integer from 3 to 6, for example, glycerol, sorbitol, hexane triol-1,2,6, and the like; compounds having the formula:

$$R\!-\!(CH_2OH)_3$$

wherein R is an alkyl group containing from 2 to 6 carbon atoms, for example, trimethylol ethane, trimethylol propane, and the like compounds up to trimethylol hexane; and the compounds having the formula:

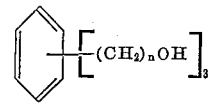

wherein $n$ is an integer from 1 to 6. As examples of compounds having the above formula there may be named trimethylol benzene-1,3,5, triethylol benzene-1,3,5, tripropyl benzene-1,3,5, tributylol benzene-1,3,5, and the like.

Aromatic polyfunctional acid esters may also be employed in this invention as chain-branching agents and particularly those having the formula:

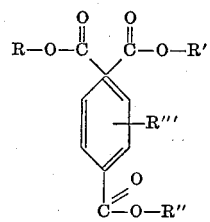

and in which R, R' and R'' are alkyl groups containing 1 to 3 carbon atoms and R''' is hydrogen or alkyl groups having 1 to 2 carbon atoms. As examples of compounds having the above formula there may be named trimethyl trimesate, tetramethyl pyromellitate, tetramethyl mellophonate, trimethyl hemimellitate, trimethyl trimellitate, tetramethyl prehnitate, and the like. In addition, there may be employed mixtures of the above esters which are obtained in practical synthesis. That is, in most instances when preparing any of the compounds having the above formula, other related compounds having the same formula may be present in small amounts as impurities. This does not affect the compound as a chain-branching agent in the preparation of the modified polyesters and copolyesters described herein.

The chain-branching agents or cross-linking agents may be employed in the preparation of the polyesters and copolyesters in amounts ranging from 0.05 mole percent to 2.4 mole percent, based on the amount of dicarboxylic acid or dialkyl ester thereof employed in the reaction mixture. The preferred range of chain-branching agent for use in the present invention is from 0.1 to 1.0 mole percent. In the practice of the present invention, the calculated amounts of chain-terminating agent or chain-terminating agent and chain-branching agent or cross-linking agent are charged to the reaction vessel at the beginning of the first stage of the esterification reaction and the reaction proceeds as in any well known esterification polymerization.

The highly polymeric linear condensation polymers selected from the group consisting of polyesters and polyester-amides, which contain in the molecular structure a substantial proportion of recurring groups having the following structural formula:

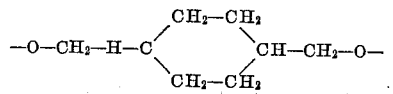

wherein the substituted cyclohexane ring is selected from the group consisting of the cis and trans isomers thereof may be used in the practice of this invention. These polymeric linear polyester and polyester-amides may be prepared by a process comprising condensing (1) either of cis or the trans isomer or a mixture of these isomers of 1,4-cyclohexanedimethanol alone or mixed with another bifunctional reactant with (2) a bifunctional carboxy compound.

The bifunctional reactants which can be employed contain no other reactive substituents which would interfere with the formation of a highly polymeric linear polymer when condensed with 1,4-cyclohexanedimethanol or a mixture thereof with such bifunctional reactants. These bifunctional reactants adapted for the preparation of linear condensation polymers are quite well known and have been discussed earlier.

The 1,4-cyclohexanedimethanol employed in any of the processes for making condensation polymers can be used in combination with an additional bifunctional coreactant such as when employing a mixture of glycols (it is advantageous to use amounts of the 1,4-cyclohexanedimethanol equal to at least 50 mole percent of the total of such coreactants employed although smaller proportions can also be used). The various bifunctional coreactants which can be employed in admixture with 1,4-cyclohexanedimethanol include other glycols and compounds which do not necessarily react with a glycol, e.g. an aminoalcohol. Such coreactants also include diamines, or aminocarboxy compounds.

The bifunctional reactants containing functional groups which can be condensed with 1,4-cyclohexanedimethanol or mixtures thereof are bifunctional compounds capable of condensation so as to form highly polymeric linear condensation polymers. Such bifunctional compounds can be solely inter-reactive with a glycol, e.g. a dicarboxylic acid or they can be both (a) coreactive in the sense they can be used in lieu of or as a partial replacement of the glycol in a polyester, and (b) inter-reactive in the sense that they condense with a glycol or a bifunctional compound which can be employed in lieu of glycol. For example, 6-amino-caproic acid is both coreactive in that the amino group is of the type which can be used in lieu of a hydroxy radical of a glycol and also inter-reactive in the sense that the carboxylic group will react with the hydroxy of a glycol or the amine of a bifunctional compound which can be used in lieu of glycol. The bifunctional compounds which are solely inter-reactive with a glycol include dicarboxylic acids, carbonates, and the like. The other bifunctional inter-reactive compounds include aminocarboxy compounds, or hydroxy carboxy compounds.

The modified linear condensation polyesters, produced in accordance with the present invention, have specific viscosities in the range of about 0.1 to about 1.0, which represent fiber- and filament-forming polymers. It is to be understood, of course, that non-fiber forming polyesters may be produced by means of the present invention which have a specific viscosity greater or less than 0.1 to 1.0 and such polyesters are useful for example, in the manufacture of coating compositions, lacquers, molding compositions, and the like.

Specific viscosity, as employed herein, is represented by the formula $$\eta_{sp} = \eta_{Rel.} - 1$$

where $\eta_{Rel.}$ is defined as the ratio of the viscosity of a solution of 0.5 gram of the polymer in 100 ml. of m-cresol to the viscosity of the solvent, both at 25° C.

The polymers which are produced in accordance with the present invention and shaped articles produced therefrom such as fibers, filaments, yarns, films and the like have improved whiteness values, that is, lack of color, as compared to the polymers and shaped articles produced by prior art procedures. Those skilled in the art will readily recognize the advantages of this improvement in polyesters.

The catalysts of the present invention are not affected by the amounts of water which is normally present during esterification, i.e., the water which is normally present in ethylene glycol. This contributes to the superior color of the finished product. Due to the fact that the present catalysts are not affected by the amounts of water normally present during esterification, there is faster reactivity during the first stage which also contributes to better color. Numerous other advantages of the instant invention will be apparent to those skilled in the art.

To further illustrate the present invention and the advantages thereof, the following specific examples are given, it being understood that these are merely intended to be illustrative and not limitative. Unless otherwise indicated, all parts and percents are by weight.

*Example 1*

Preparation of bis-(1-phenyl-1,3-butanediono) zinc. Six grams (0.037 mole) of 1-phenyl-1,3-butanedione was dissolved in 150 ml. of methanol. A solution of 4.0 grams (0.018 mole) of zinc acetate in 100 ml. of methanol was added slowly with stirring to the solution containing the diketone. A pH meter was immersed in the reaction mixture and a 0.5 N solution of sodium hydroxide was added dropwise to the mixture until a pH of 6.9 was reached. Water was then added dropwise to the mixture until a precipitate began to form. The mixture was chilled to 0–5° C. and stirring continued for another 30 minutes. The white, crystalline precipitate obtained was filtered out of solution, washed with water, dried, and recrystallized from methanol. A yield of 5.1 grams representing 58.5% of the calculated yield was obtained. This product had a melting point of 112–115° C. and analysis of the composition showed the following:

Calculated: C, 62%; H, 4.65%; water, 0%. Found: C, 60.3%; H, 5.25%; water, 0.5%.

*Example 2*

Preparation of bis-(1-phenyl-4,4,4-trifluoro-1,3-butanediono) zinc. 4.54 grams (0.021 mole) of 1-phenyl-4,4,4-trifluoro-1,3-butanedione was dissolved in 100 ml. of methanol. A solution of 2.2 grams (0.01 mole) of zinc acetate in 100 ml. of methanol was added slowly with stirring to the solution containing the diketone. A pH meter was immersed in the reaction mixture and a 0.4 N solution of sodium hydroxide was added dropwise to the mixture until a pH of 6.9 was reached. After stirring the mixture for 1 hour, water was added dropwise to the mixture until a precipitate began to form. The mixture was chilled to 0–5° C. and stirred for one hour. The precipitate obtained was filtered out of solution, washed with water, dried and recrystallized from methanol. Analysis of this precipitate showed the following:

Calculated: C, 48.6%; H, 2.44%; water, 0%. Found: C, 47.8%; H, 2.85%; water, 0.35%.

*Example 3*

Production of a polyester using zinc acetylacetonate as a catalyst. A mixture of 250 parts of dimethyl terephthalate, 300 parts of ethylene glycol, 15 parts of methoxypolyethylene glycol having a molecular weight of about 2000, 0.25 part of pentaerythritol and 0.152 part of zinc acetylacetonate was placed in a reaction vessel, which was fitted with a nitrogen inlet tube and a condenser, and heated for 45 minutes at 175–180° C. while bubbling nitrogen through the reaction mixture. The methanol formed as a result of the ester interchange reaction was distilled out of the reaction vessel. The reaction was then heated at 280–285° C. under atmospheric pressure for 30 minutes to remove the excess ethylene glycol by distillation. The residue was then heated at 285° C. under a reduced pressure of less than 1 mm. of mercury in order to complete the polyesterification.

After 44 minutes a polymer having a specific viscosity of 0.262 as measured in a phenol-trichlorophenol solvent was obtained. The polymer obtained had excellent color and could be readily spun into cold-drawable fibers and filaments.

*Example 4*

Production of a polyester using bis-(1-phenyl-4,4,4-trifluoro-1,3-butanediono) zinc as a catalyst. The process of Example 3 was repeated except that 0.288 part of bis-(1-phenyl-4,4,4-trifluoro-1,3-butanediono) of Example 1 was used as a catalyst in place of the zinc acetylacetonate of Example 3. This weight of catalyst was chosen to have an amount of zinc equivalent to the zinc acetylacetonate of Example 1. After 25 minutes of polyesterification, a polymer having a specific viscosity of 0.233 as measured in a phenol-trichlorophenol solvent was obtained. The polymer obtained had excellent color and could be readily spun into cold-drawable fibers and filaments.

*Example 5*

Production of a polyester using zinc acetylacetonate as a catalyst. A mixture of 215 parts of terephthalic acid, 460 parts of ethylene glycol, 15 parts of methoxypolyethylene glycol having a molecular weight of about 2000, 0.25 part of pentaerythritol, and 0.152 part of zinc acetylacetonate was placed in a reaction vessel, which was fitted with a nitrogen inlet tube and a condenser, and heated at a temperature of 230–235° C. under a pressure of 25 p.s.i.g. for a period of 40 minutes while bubbling nitrogen through the reaction mixture. The methanol formed as a result of the ester interchange reaction was distilled out of the reaction vessel. The reaction mixture was then heated at 275° C. under atmospheric pressure for 30 minutes to remove the excess ethylene glycol by distillation. The residue was then heated at 275° C. under a reduced pressure of less than 1 mm. of mercury in order to complete the polyesterification. After 53 minutes a polymer having a specific viscosity of 0.275 as measured in a phenol-trichlorophenol solvent was obtained. The polymer obtained had excellent color and could be readily spun into cold-drawable fibers and filaments.

*Example 6*

Production of polyester using bis-(1-phenyl-1,3-butanediono) zinc as a catalyst. The process of Example 5 was repeated except that the following proportions by weight were charged to the reaction vessel: 200 parts of terephthalic acid, 446 parts of ethylene glycol, 14 parts of methoxypolyethylene glycol having a molecular weight of about 2,000, 0.233 part of pentaerythritol, 0.207 part of bis-(1-phenyl-1,3-butanediono) zinc. This weight of catalyst was chosen to have an amount of zinc equivalent to the zinc acetylacetonate of Example 5. After 20 minutes of polyesterification, a polymer having a specific viscosity of 0.302 as measured in a phenol-trichlorophenol solvent was obtained. The polymer obtained had excellent color and could be readily spun into cold-drawable fibers and filaments.

*Example 7*

Production of polyester using bis-(1-phenyl-4,4,4-trifluoro-1,3-butanediono) zinc as a catalyst. The process of Example 5 was repeated except that the following proportions by weight were charged to the reaction vessel: 200 parts of terephthalic acid, 446 parts of ethylene glycol, 14 parts of methoxypolyethylene glycol having a molecular weight of about 2,000, 0.233 part of pentaerythritol, and 0.264 part of bis-(1-phenyl-4,4,4-trifluoro-1,3-butanediono) zinc. This weight of catalyst was chosen to have an amount of zinc equivalent to the zinc acetylacetonate of Example 5. After 16 minutes of polyesterification, a polymer having a specific viscosity of 0.310 as measured in a phenol-trichlorophenol solvent was obtained. The polymer obtained had excellent color and could be readily spun into cold-drawable fibers and filaments.

*Example 8*

Production of unmodified polyethylene terephthalate using bis-(1-phenyl-4,4,4-trifluoro-1,3-butanediono) zinc as a catalyst. The process of Example 3 may be repeated except that the following proportions by weight may be charged to the reaction vessel: 265 parts of dimethyl terephthalate, 300 parts of ethylene glycol and about 0.288 part of bis-(1-phenyl-4,4,4-trifluoro-1,3-butanediono) zinc. This weight of catalyst is chosen to have an amount of zinc equivalent to the zinc acetylacetonate of Example 3. After about 25 minutes of polyesterification, a polymer could be obtained having excellent properties and which could be readily spun into cold-drawable fibers and filaments.

*Example 9*

Production of unmodified polyethylene terephthalate using bis-(1-phenyl-4,4,4-trifluoro-1,3-butanediono) zinc as a catalyst. The process of Example 5 may be repeated except that the following proportions by weight may be charged to the reaction vessel: 200 parts of terephthalic acid, 450 parts of ethylene glycol and 0.26 part of bis-(1-phenyl - 4,4,4 - trifluoro-1,3-butanediono) zinc. This weight of catalyst is chosen to have an amount of zinc equivalent to the zinc acetylacetonate of Example 5. After 20 minutes of polyesterification, a polymer could be obtained having excellent properties and which could be readily spun into cold-drawable fibers and filaments.

It is to be understood that changes and variations may be made in the present invention without departing from the spirit and scope thereof as defined in the appended claims.

We claim:

1. In a process for producing synthetic, highly polymeric polyesters wherein at least one compound selected from the group consisting of dicarboxylic acids and dialkyl esters of dicarboxylic acids and at least one glycol of the series $$HO(CH_2)_nOH$$

wherein $n$ is an integer from 2 to 10 are esterified under esterification conditions and the reaction product is polymerized until a highly polymeric product is formed, the improvement which comprises carrying out the esterification and the polymerization in the presence of a catalytic amount of a zinc chelate catalyst of the formula

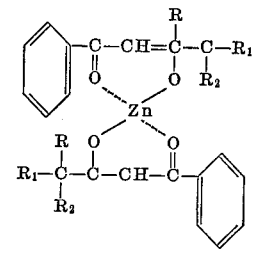

wherein R, $R_1$ and $R_2$ are members of a group consisting of hydrogen and halogen atoms.

2. A process as defined in claim 1 wherein the reactions are carried out in the presence of from about .02 to about 2.0 percent, based on the weight of the selected compound, of the zinc chelate catalyst.

3. A process as defined in claim 1 wherein the reactions are carried out in the presence of from about .05 to about 0.5 percent, based on the weight of the selected compound, of the zinc chelate catalyst.

4. In a process for producing synthetic, highly polymeric polyesters wherein at least one compound selected from the group consisting of dicarboxylic acids and dialkyl esters of dicarboxylic acids, and at least one glycol of the series $$HO(CH_2)_nOH$$

wherein $n$ is an integer from 2 to 10 are reacted under esterification conditions and the reaction product is polymerized until a highly polymeric product is formed, the improvement which comprises carrying out the polymerization reaction in the presence of a catalytic amount of a zinc chelate catalyst of the formula

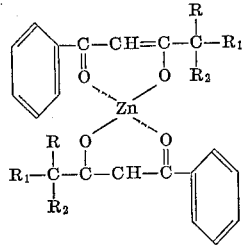

wherein $R$, $R_1$ and $R_2$ are members of a group consisting of hydrogen and halogen atoms.

5. A process as defined in claim 4 wherein the polymerization reaction is carried out in the presence of from about .02 to about 2.0 percent, based on the weight of the selected compound, of the zinc chelate catalyst.

6. A process as defined in claim 4 wherein the polymerization reaction is carried out in the presence of from about .05 to about 0.5 percent, based on the weight of the selected compound, of the zinc chelate catalyst.

7. In a process for producing synthetic, highly polymeric polyesters wherein at least one compound selected from the group consisting of dicarboxylic acids and dialkyl esters of dicarboxylic acids and at least one glycol of the series $$HO(CH_2)_nOH$$

wherein $n$ is an integer from 2 to 10 are reacted under esterification conditions and the reaction product is polymerized until a highly polymeric product is formed, the improvement which comprises conducting said esterification reaction in the presence of a catalytic amount of a zinc chelate catalyst of the formula

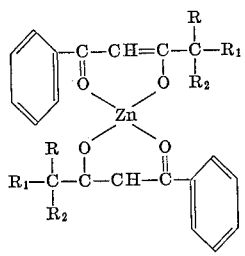

wherein $R$, $R_1$ and $R_2$ are members of a group consisting of hydrogen and halogn atoms.

8. A process as defined in claim 7 wherein the esterification reaction is carried out in the presence of from about .02 to about 2.0 percent, based on the weight of the selected compound, of the zinc chelate catalyst.

9. A process as defined in claim 7 wherein the esterification reaction is carried out in the presence of from about .05 to 0.5 percent, based on the weight of the selected compound, of the zinc chelate catalyst.

References Cited
UNITED STATES PATENTS

| | | | |
|---|---|---|---|
| 2,857,363 | 10/1958 | Easley et al. | 260—75 |
| 2,895,946 | 7/1959 | Huffman | 260—75 |
| 2,933,475 | 4/1960 | Hoover | 260—75 |
| 3,063,956 | 11/1962 | Beindorf et al. | 260—75 |

WILLIAM H. SHORT, *Primary Examiner.*

LOUISE P. QUAST, *Examiner.*